United States Patent [19]

Bates

[11] Patent Number: 5,309,670
[45] Date of Patent: May 10, 1994

[54] PLANT STAND

[76] Inventor: Charles L. Bates, 1598 Hatteras Sound, Mt. Pleasant, S.C. 29464

[21] Appl. No.: 967,165

[22] Filed: Oct. 27, 1992

[51] Int. Cl.$^5$ ............................................. A01G 9/04
[52] U.S. Cl. .......................................... 47/71; 47/39; 248/346.1
[58] Field of Search .................. 47/71, 39; 248/310, 248/346.1

[56] References Cited

U.S. PATENT DOCUMENTS

| | | | |
|---|---|---|---|
| 2,707,351 | 5/1955 | Walker | 47/39 |
| 3,676,953 | 7/1972 | Delogne | 47/81 |
| 4,059,920 | 11/1977 | Worrell | 47/71 |
| 4,224,764 | 9/1980 | Dziewulski et al. | 248/346.1 |
| 4,760,987 | 8/1988 | Lan | 248/346.1 |
| 4,833,823 | 5/1989 | Edwards, III | 248/346.1 |

Primary Examiner—Carl D. Friedman
Assistant Examiner—Christopher Todd Kent
Attorney, Agent, or Firm—B. Craig Killough

[57] ABSTRACT

A stand for plants such as potted plants which elevates the plant and pot from the floor. A base comprises frictional contact areas which contact a pot, or alternatively, a dish which may be used in conjunction with the base. The base allows the feet of differing and various configurations to be used in conjunction with the stand depending on the nature of the flooring surface. The stand may be used in conjunction with a dish having a wall and lugs which retain the stand within the dish. For added support, a second base may be used which is inserted into a void of a larger base.

10 Claims, 2 Drawing Sheets

PLANT STAND

BACKGROUND OF THE INVENTION

This invention relates to stands or supports for plants such as potted plants which are commonly used indoors, and the device particularly relates to a stand which may be used to elevate a plant above a flooring surface to facilitate growth of the plant and minimize damage to the flooring surface while containing and supporting the plant.

Live plants are commonly and frequently placed into pots having dirt or other materials in which the plant grows within the pot. Potted plants are found both indoors and outdoors. Particularly when used indoors, the pots in which the plants are contained are placed directly on a flooring surface, which may be carpet, wood, tile, or other flooring material.

Potted plants may cause damage to the flooring surface. The necessity of watering live plants may cause damage or mess as a result of the mixture of dirt and water. Further, the weight of the pot itself or an abrasive bottom surface of the pot may cause damage to the flooring. The water may cause mildew, or may cause rot as a result of water being retained by the pot with no air space between the pot and the flooring surface.

SUMMARY OF THE INVENTION

The present invention provides a base onto which a pot for a potted plant may be placed. The base elevates the pot slightly above the floor to provide an airspace between the flooring material and the potted plant. The base has projections into which the feet may be inserted. These feet contact the floor, and may be of various configurations depending on the flooring surface.

Alternatively, a dish may be used in conjunction with the base. The dish has a wall extending from the bottom surface of the dish, and a plurality of lugs extending from the bottom surface of the dish. The plant stand is retained between the wall and the lugs. Additionally, a second base may be utilized by placing it within the lugs and within a void of the first plant stand.

DETAILED DESCRIPTION

Figure 2:
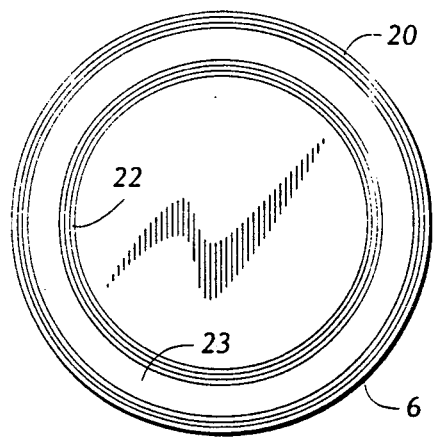
FIG. 2 is a top, plan view of the base.
Figure 3:
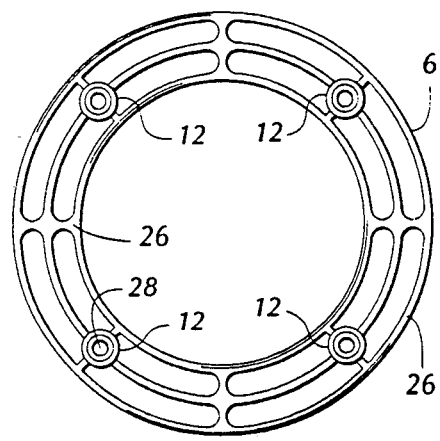
FIG. 3 is a bottom view of the base.

Referring to FIGS. 2 and 3, the base is exemplified by a perimeter having a void therein. In the preferred embodiment, the base is round, since most pots for plants have round bottoms, although the base could be square, rectangular, octagonal or otherwise.

As shown in FIG. 2, the top surface of the base has a raised frictional area 20 on the outside the perimeter of the base, and a raised frictional area 22 about the void. These raised areas provide a frictional surface for the pot to rest upon if the pot for the potted plant is placed directly on the base, or alternatively, provide a frictional surface for the dish. The raised frictional areas 20, 22 are separated by a recessed area 23.

The geometry of the base is shown as preferred in FIG. 3. Various ribs 26 are formed into the base to give the base sufficient structural integrity to support a heavy plant.

Figure 5:
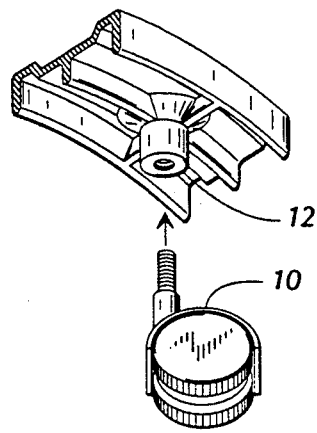
FIG. 5 is a partial exploded view of a caster 10 inserted into a projection 12 of a base.
Figure 6:
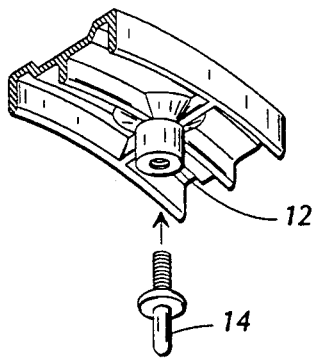
FIG. 6 is a partial exploded view of a peg 14 to be replaced within a projection of a base.
Figure 7:
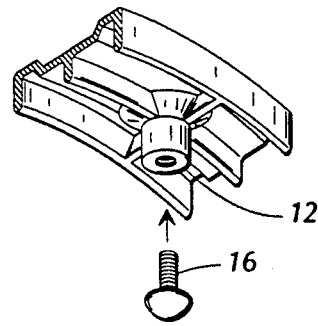
FIG. 7 is a partial, exploded view of foot 16 with a projection of a base.
Figure 8:
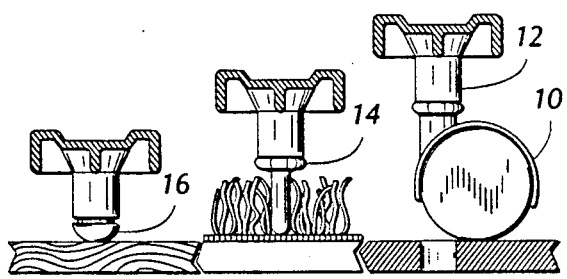
FIG. 8 is a side elevation of the caster of FIG. 5, the peg of FIG. 6, and the foot of FIG. 8 placed upon various flooring surfaces.

Projections 12 extend from the bottom surface of the base. The projections serve as legs to elevate the base, and accordingly, the potted plant, from the flooring surface. These projections have voids 28 formed therein. These voids may be threaded to receive casters or other feet as shown in FIGS. 5, 6 and 7.

It is desirable to use different feet on different surfaces. It may be desirable to use a caster 10 if the plant is located on a relatively hard, flat surface which will allow the plant stand to roll. On a relatively hard surface which may be easily scarred, a resilient foot 16 may be used which will support the plant stand without scarring or otherwise damaging the floor. The resilient foot could be rubber or plastic or other similar material. A relatively long peg 14 may be used with carpet which will allow the plant stand to be sufficiently elevated to achieve an air flow between the plant stand and the flooring surface so that the goal of achieving drying of any moisture is obtained.

Figure 1:
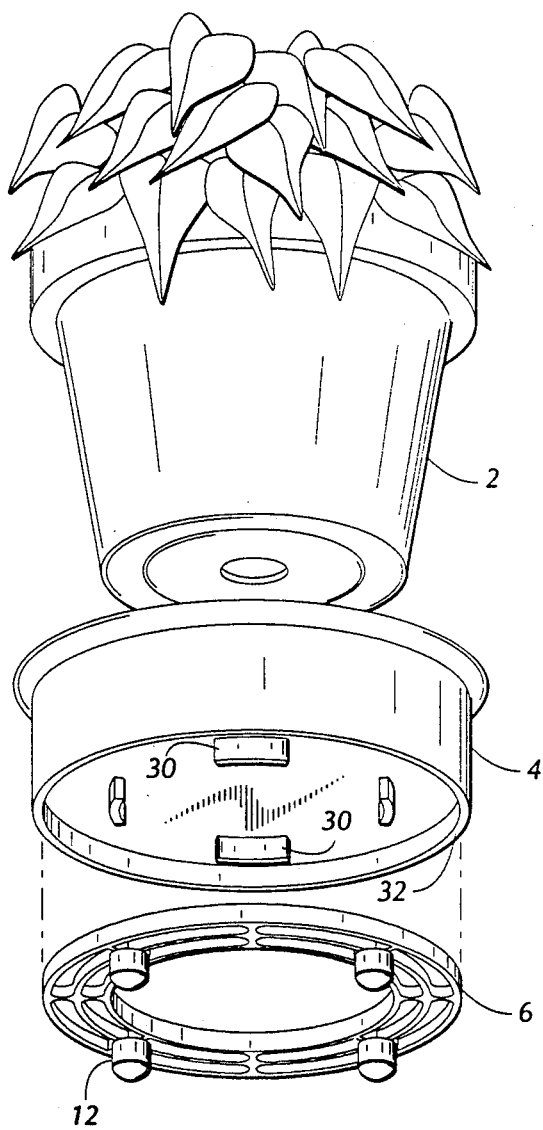
FIG. 1 is an exploded view of a potted plant 2, the plant dish 4 and the base 6.

As shown in FIG. 1, a dish 4 may be provided into which the potted plant is placed. This dish has a plurality of lugs 30 extending from the bottom surface of the dish. A base 6 may be inserted into the dish, with the lugs passing through the void in the base to retain the base. To provide additional frictional contact and to increase the retention characteristic, a wall 32 extends vertically downward and generally perpendicular to the plane of the bottom of the dish, which contacts the perimeter of the base.

Figure 4:
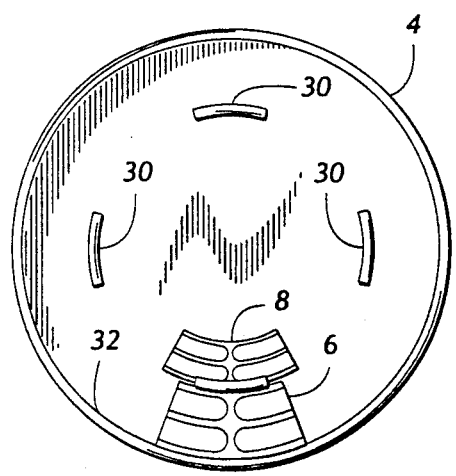
FIG. 4 is a bottom view of the dish 4, with a partial view of a first base 6 and a second base 8 retained within the dish.
Figure 10:
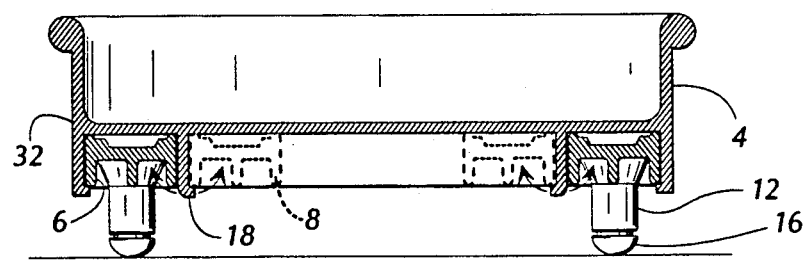
FIG. 10 is a cross sectional view of a side elevation of a dish showing a first base 6 and a second base 8 located therein.

As shown in FIGS. 4 and 10, the base is placed between the wall 32 and the lugs 30, with the lugs extending through the void in the base. The lugs have a resilient characteristic which allows them to be deformed slightly as the base is placed within the dish. The deformation characteristic then applies pressure to the base, holding the base against the lugs and the wall and retaining the base securely therein.

Figure 9:
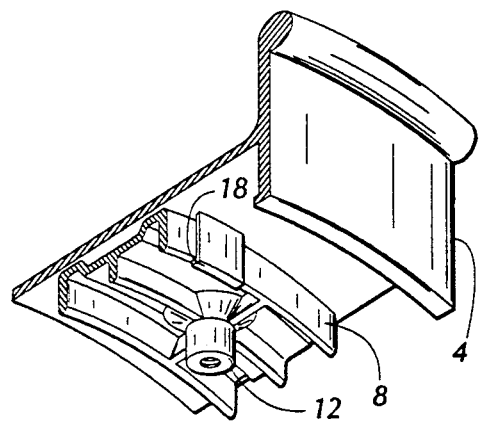
FIG. 9 is a partial, perspective view of the dish with a base retained therein by a lug 30 having a lip 18 thereon.

Also as shown in FIGS. 4 and 10, a second base 8 may be placed within the dish for additional support, or alternatively, the second base could be used by itself. The second base is retained by contact between the lugs and the perimeter of the second base. The lugs 30 have a lip 18 thereon which overlaps the base to hold the base within the dish. FIG. 9.

The base may be used by itself without a dish to support a potted plant. The base may be used as inserted into the dish. A second base having an outside diameter which is less than the outside diameter of the void allows the second base to be used in conjunction with the dish and the first base. The second base may be used in conjunction with the dish without the use of a larger diameter outside base. Various legs or casters may be inserted into the projections of the base to properly elevate the plant stand from the flooring surface, provide for protection for the flooring surface, or allow the device to be rolled by means of casters.

What is claimed:

1. A potted plant stand, comprising:
   a. a dish having a generally planar bottom surface and having a side wall extending above and vertically below a perimeter of said bottom surface so as to form a continuous wall about the perimeter which is generally perpendicular to said bottom surface, and having a plurality of lugs which are each located an equal distance from said wall and which extend vertically downward from said bottom surface; and
   b. a nominally planar base having a void in a center thereof, wherein said base is located within said bottom surface of said dish between said wall and said lugs wherein said lugs extend through said void to retain said base within said dish.

2. A potted plant stand as described in claim 1, wherein each of said lugs has a lip thereon on an end of said lug which is opposite a bottom surface of said dish.

3. A potted plant stand as described in claim 1, further comprising a second nominally planar base which is located within said dish wherein a perimeter of said second base contacts said lugs and is retained therein by said lugs.

4. A potted plant stand as described in claim 2, further comprising a second generally planar base which is located within said dish wherein a perimeter of said second base contacts said lugs and said lip of said lugs and is retained therein by said lugs and said lip of said lugs.

5. A potted plant stand, comprising:
   a. a dish having a generally planar bottom surface and having a side wall extending above and vertically below a perimeter of said bottom surface so as to form a continuous wall about the perimeter which is generally perpendicular to said bottom surface, and having a plurality of lugs which are each located an equal distance from said wall and which extend vertically downward from said bottom surface; and
   b. a nominally planar base having a void generally in a center thereof, and having a top surface with a frictional area about a perimeter of the top surface, and an additional frictional area about a perimeter of the void, with each of said frictional areas contacting a bottom surface of the plant dish, and wherein said top surface has a continuous area between said frictional surfaces which does not contact said plant dish, and wherein said base is located within said bottom surface of said dish between said wall and said lugs wherein said lugs extend through said void to retain said base within said dish.

6. A potted plant stand as described in claim 5, wherein each of said lugs has a lip thereon on an end of said lug which is opposite a bottom surface of said dish.

7. A potted plant stand as described in claim 5, further comprising at least three projections extending from a bottom surface of said base having receptacles therein, and having at least three feet which are inserted into said receptacles of said projections.

8. A potted plant stand as described in claim 6, further comprising at least three projections extending from a bottom surface of said base having receptacles therein, and having at least three feet which are inserted into said receptacles of said projections.

9. A potted plant stand, comprising:
   a. a dish into which a plant is placed, having a generally flat bottom surface, and having a continuous side wall completely surrounding a perimeter of said bottom which extends above and vertically below said bottom, wherein said side wall has a lip on a bottom point of said wall which extends inwardly from said side wall toward said bottom;
   b. at least two projections extending from said bottom surface of said dish, each of said projections having a lip on a bottom point of said projection which extends inwardly, and wherein said projections are spaced apart from said wall, and wherein each of said projections is a same distance from said side wall as a remainder of said projections;
   c. a base having a top surface and an outer side wall extending vertically downward from said top surface, and an inner side wall extending vertically downward from said top surface forming a void in a center of said base, and wherein said base is positioned within said dish between said vertical side wall of said dish and said projections and wherein said vertical side wall of said dish extends below said outer side wall of said base; and
   d. at least three feet extending from said base located on said base opposite said top surface of said base.

10. A potted plant stand as described in claim 9, further comprising a second base having a top surface, an outer side wall extending vertically downward from said top surface wherein said second base is positioned within said dish and within said center void of said base, and wherein said second base is retained within said dish by said lip on said projections which extend below said outer side wall of said second base.

* * * * *